United States Patent [19]
Herold et al.

[11] Patent Number: 5,355,516
[45] Date of Patent: Oct. 11, 1994

[54] METHOD FOR REDUCING SUPERFLUOUS CHANNEL ALLOCATION IN A CELLULAR RADIOTELEPHONE COMMUNICATION SYSTEM

[75] Inventors: Brenda K. Herold, Carol Stream; Christine K. Ioriatti, Union, both of Ill.

[73] Assignee: Motorola, Inc., Schaumburg, Ill.

[21] Appl. No.: 589,953

[22] Filed: Sep. 28, 1990

[51] Int. Cl.$^5$ ............................................. H04Q 7/00
[52] U.S. Cl. ................... 455/34.1; 455/54.2; 379/63
[58] Field of Search ............ 455/33.1, 33.2, 34.1, 455/34.2, 54.1, 54.2, 56.1; 379/58, 59, 60, 63

[56] References Cited
U.S. PATENT DOCUMENTS

| | | | |
|---|---|---|---|
| 4,612,415 | 3/1986 | Zdunek et al. | 455/34.1 |
| 4,870,408 | 9/1989 | Zdunek et al. | 455/34.1 |
| 4,881,271 | 11/1989 | Yamauchi et al. | 379/58 |
| 4,905,302 | 2/1990 | Childress et al. | 455/34.1 |
| 5,063,588 | 11/1991 | Patsiokas et al. | 379/57 |

Primary Examiner—Edward F. Urban
Attorney, Agent, or Firm—Val Jean F. Hillman

[57] ABSTRACT

In a communication system which performs radio channel management, there is provided a method and and apparatus for reducing superfluous channel allocation between a plurality of mobile units, making multiple requests, and the communication system comprising the steps of A) receiving a channel request from at least one of the plurality of mobile units, B) determining the processing delays introduced by the communication system in response to the channel request; and C) adjusting the mobile unit retry (retransmit) interval as a function of the processing delay in order to reduce the likelihood that more than one channel will be assigned to a single mobile unit by causing the mobile unit to wait longer between subsequent channel request attempts. An alternative embodiment suggests adjusting the mobile unit retry interval based upon a level of channel request traffic.

18 Claims, 4 Drawing Sheets

METHOD FOR REDUCING SUPERFLUOUS CHANNEL ALLOCATION IN A CELLULAR RADIOTELEPHONE COMMUNICATION SYSTEM

TECHNICAL FIELD

The present invention relates generally to communication systems. More particularly this invention relates to channel allocation within a cellular radiotelephone communication system. Specifically, however, this invention relates to a method and apparatus for reducing superfluous channel allocations in a cellular radiotelephone communication system servicing a plurality of mobile units making multiple requests, thereby reducing the likelihood that more than one channel will be assigned to a single mobile unit.

BACKGROUND OF THE INVENTION

Radiotelephone service has been in use for some time and has traditionally been characterized by a central site transmitting with high power to a limited number of mobile units in a large geographic area. Mobile transmissions, due to their lower power, are received by a network of receivers located remotely from the central site and then returned to the central site for processing.

In yet another configuration, the radio coverage area is divided into contiguous smaller zones of coverage (cells) using lower power transmitters and receivers at the central site. One such system is described in U.S. Pat. No. 3,906,166 assigned to the assignee of the present invention. The limited coverage area enables the channel frequencies used in one cell to be reused in another cell geographically separated according to specified plans. One such plan is disclosed in U.S. Pat. No. 4,128,740, assigned to the assignee of the present invention. Consequently, a large number of channels can be made available in a metropolitan area, and the service appears to be identical to the standard telephone.

Each cell dedicates one or more communication channels as a Common Control Channel (CCCH). The CCCH is made up of several logical channels which provide different services to the mobile subscriber. The Random Access Channel (RACH) is used for receiving channel requests from mobile subscriber units. The Access Grant Channel (AGCH) is used to instruct mobile subscriber units, via channel assignment signals, to tune to a particular frequency and timeslot where further signalling may take place. The CCCH shares the same frequency and timeslot as the Broadcast Control Channel (BCCH) which is used to transmit cell specific parameters to the mobile subscribers tuned to the cell. A typical channel allocation scenario is summarized as follows. A mobile unit sends a channel request over the RACH, starts a guard timer, and awaits a channel assignment signal or an assignment reject signal from the Base Station System (BSS), informing the mobile whether channel allocation was successful or not. Upon expiration of the guard timer, however, the mobile unit will transmit another channel request. This procedure will continue until the mobile unit is successfully assigned a Dedicated Control Channel (DCCH), or until a maximum number of retries has been attempted, as defined by the BSS broadcast channel.

For security purposes, mobile unit channel requests do not contain mobile identification information. Instead, they contain a random reference number selected and remembered by the requesting mobile unit. The BSS therefore has no mobile specific information with which to distinguish one channel request from another. Accordingly, the above described scenario is extremely susceptible to the misallocation of system resources.

If the BSS fails to respond to a mobile unit's initial channel request within the mobile unit's guard time, hereinafter referred to as the channel request retry interval, or simply the retry interval, the mobile unit will send a new request. Since the BSS has no mobile specific information regarding the origin of this request, there is no means to correlate the mobile unit's new request with a request already in progress for this mobile unit. This may result in the BSS processing both requests, thereby activating two channels for the same mobile unit. Since the mobile will respond to the first assignment signal received from the BSS, the second will go unanswered thereby resulting in a wasted channel.

The occasional channel misallocation is not catastrophic to system performance, since the unused channel will eventually be returned to service. However, the increased occurrence of misallocation, or misallocation during periods of heavy use is a formidable obstacle to the efficient operation of a modern cellular radiotelephone communication system. For example, during periods of heavy use, a BSS typically takes more time to process each incoming channel request. Awaiting mobile units, therefore, are more likely to retry channel requests because of the slowed BSS response. As no mobile identity is included in these requests, the BSS will likely respond to both, and activate two channels for a single mobile unit, thereby wasting system resources at a time when resources are already at a premium.

It would be extremely advantageous therefore to provide a method and an apparatus for reducing superfluous channel allocations in a cellular radiotelephone communication system servicing a plurality of mobile units which make multiple requests, thereby reducing the likelihood that more than one channel will be assigned to a single mobile unit.

SUMMARY OF THE INVENTION

Briefly described, the present invention is a method and apparatus for reducing superfluous channel allocation between a plurality of mobile units, making multiple requests, and a communication system servicing those mobile units. The communication system is designed for receiving channel requests from at least one of the plurality of mobile units, and determining the processing delay of that channel request. Thereafter, the communication system is responsible for adjusting the mobile unit's channel request retry interval as a function of the processing delay in order to reduce the likelihood that more than one channel will be assigned to a single mobile unit. In yet another embodiment, it is suggested that mobile unit channel request retry intervals be adjusted as a function of the level of channel request traffic on the RACH.

DETAILED DESCRIPTION OF THE PREFERRED EMBODIMENT

Figure 1:
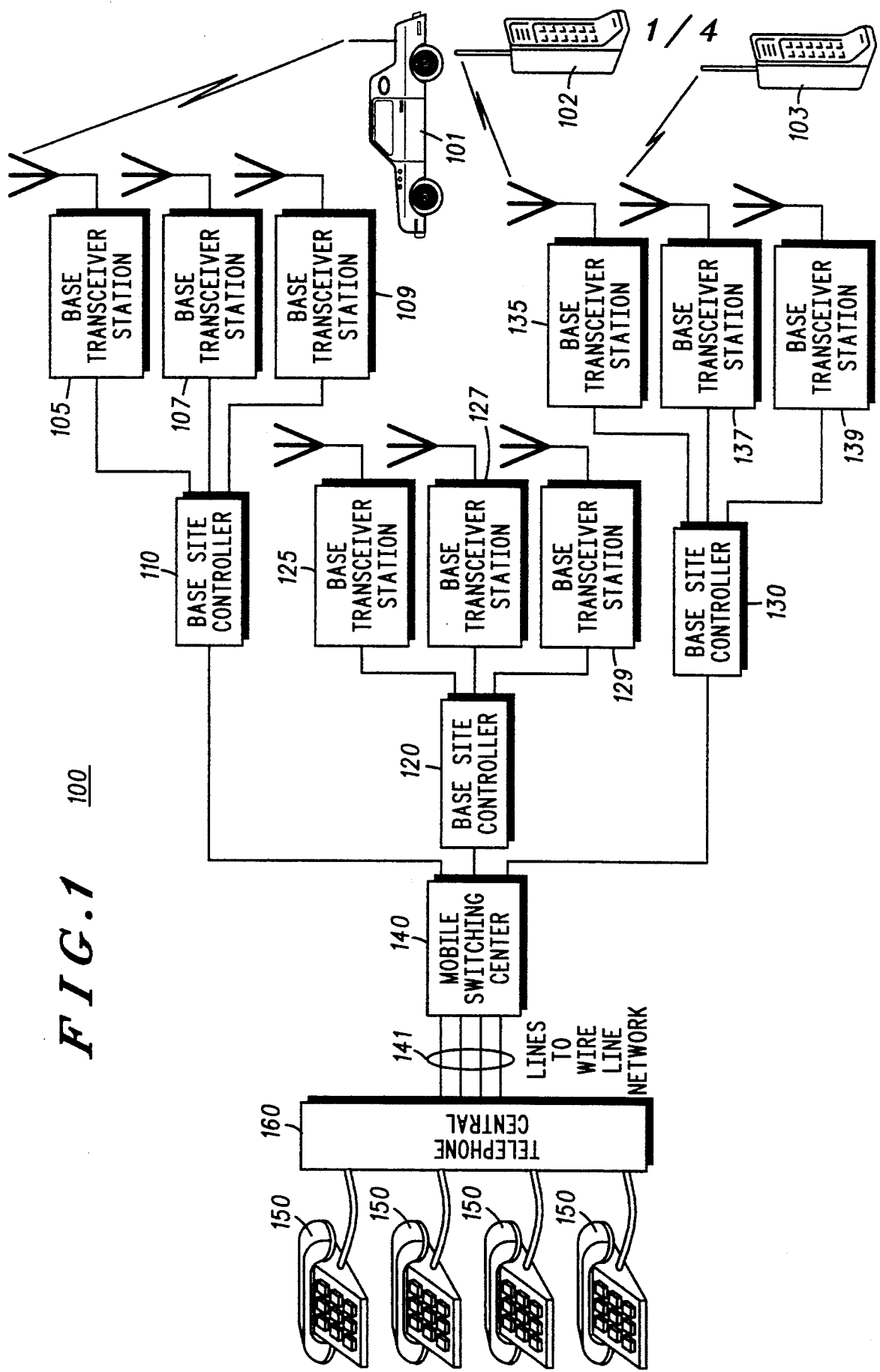
FIG. 1 is a partial block diagram of the communication system according to the present invention.

A principal application of the present invention is for a cellular radiotelephone communication system. Referring to FIG. 1, there is shown a partial block diagram of a communication system 100 showing the interconnection between the Base Transceiver Stations (BTS) and the mobile units which communicate with the system. Three Base Station Controllers (BSC) 110, 120, and 130 are shown. Each BSC controls one or more BTSs. For example, BSC 110 is shown connected to BTS units 105, 107, and 109. Collectively, a BSC and its accompanying BTSs are referred to as a Base Station System (BSS). Each BSS is responsible for sending and receiving communication signals to and from various mobile units. For the purpose of simplicity, only three BSSs are shown, each consisting of a single BSC with three BTSs. It will be appreciated by those skilled in the art however, that any number of BSSs may be used depending on the size of the area to be covered.

Each of the BSCs 110, 120, and 130 is further connected to the Mobile Switching Center 140 which is also connected to a standard wire line telephone network via lines 141. The lines 141 provide a connection to a plurality of fixed telephones 150 via a telephone central 160. Three mobile units 101, 102, and 103, each containing a transmitter and a receiver for communicating with the BSSs are shown. While only three mobile units are depicted, it will be appreciated by those skilled in the art that the actual number of mobile units serviceable by the communication system 100 is limited only by the number of BSSs, the number of frequencies allocated to the system, and the number of lines allocated to connections with the wire line network.

In operation, incoming messages, like channel request signals, are transmitted by a mobile unit, for example, mobile unit 101. When received by a BSS, the request is processed and a decision is made whether or not to allocate system resources for this request. The BSS then returns outgoing messages, like assignment or assignment reject signals to the mobile unit. Assuming adequate resources are available, the assignment signal transmitted by the BSS will inform the mobile unit 101 what frequency and timeslot to tune to in order to find an available communication channel. As previously discussed, this channel is known as the DCCH. Next, message signals from the mobile unit 101 are processed by the BSS. Thereafter, some are routed to the Mobile Switching Center 140 for further handling. The Mobile Switching Center 140 for example, connects BSC 110 to either the wire line telephone network or to another BSC, such as BSC 130, depending upon whether communication with a fixed or mobile telephone is desired.

Figure 2:
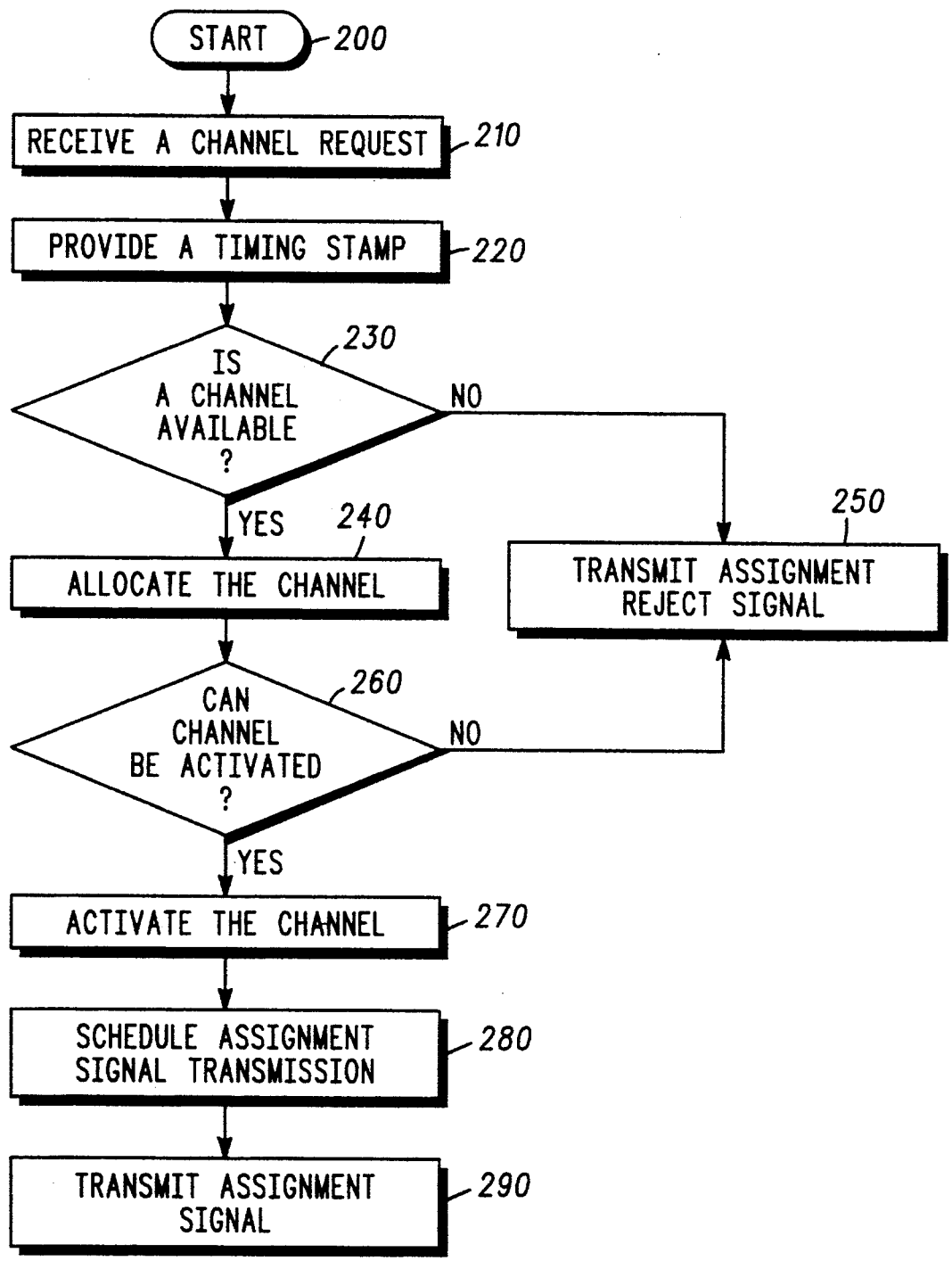
FIG. 2 is a flow chart of the channel allocation method according to the present invention.

When a BSS receives a mobile unit channel request, a number of steps must occur prior to the allocation of a communication channel. Referring to FIG. 2, a flow chart of the channel allocation method according to the present invention is shown. The flow chart in FIG. 2 is entered at start block 200 whenever a channel request signal is transmitted by one of the plurality of mobile units serviced by the communication system of FIG. 1.

At block 210 the channel request signal is received by one of the system BSSs. Next, at block 220 the received channel request is provided a timing stamp which allows the system to identify the instant that the channel request was received. Proceeding to decision block 230, after the channel request with accompanying timing stamp arrives at the BSS, a check is made to see if there is an available communication channel which may be allocated to the requesting mobile unit. If not, NO branch is taken to block 250 where an assignment reject signal is transmitted by the BSS to the mobile unit, informing the mobile unit that its request will not be serviced. At this point the mobile is free to transmit additional channel requests. Otherwise, YES branch is taken to block 240, where an available communication channel is allocated for the requesting mobile unit. Next, at decision block 260 a check is made to see whether the allocated communication channel can be activated. If not, NO branch is taken back to block 250 where an assignment reject signal is transmitted by the BSS to the mobile unit, informing the mobile unit that its request will not be serviced. Once again, the mobile unit will be free to transmit additional channel requests. Otherwise, YES branch is taken to block 270, where the allocated communication channel is activated.

Proceeding to block 280, the BSS next schedules a time when an assignment signal is to be transmitted to the requesting mobile. This scheduling is based on the timing stamp information placed on the channel request at block 220. Finally, at block 290, an assignment signal, corresponding to the mobile units initial channel request, is transmitted to the mobile unit, informing the mobile which frequency and timeslot to tune to in order to begin communication.

As previously discussed, whenever a mobile unit transmits a channel request signal, it starts a guard timer. If the BSS fails to respond to the mobile within this controlled period of time, the mobile unit will be free to transmit yet another channel request. Since the BSS receives no mobile specific information regarding incoming channel requests, it has no means of correlating a newly received channel request from those channel requests in progress. This will often result in two or more channels being allocated to a single mobile unit. It will be appreciated by those skilled in the art that such occurrences are quite disruptive to the efficient operation of a modern cellular radiotelephone communication system during periods of heavy loading or as the system is experiencing equipment failures.

Figure 3:
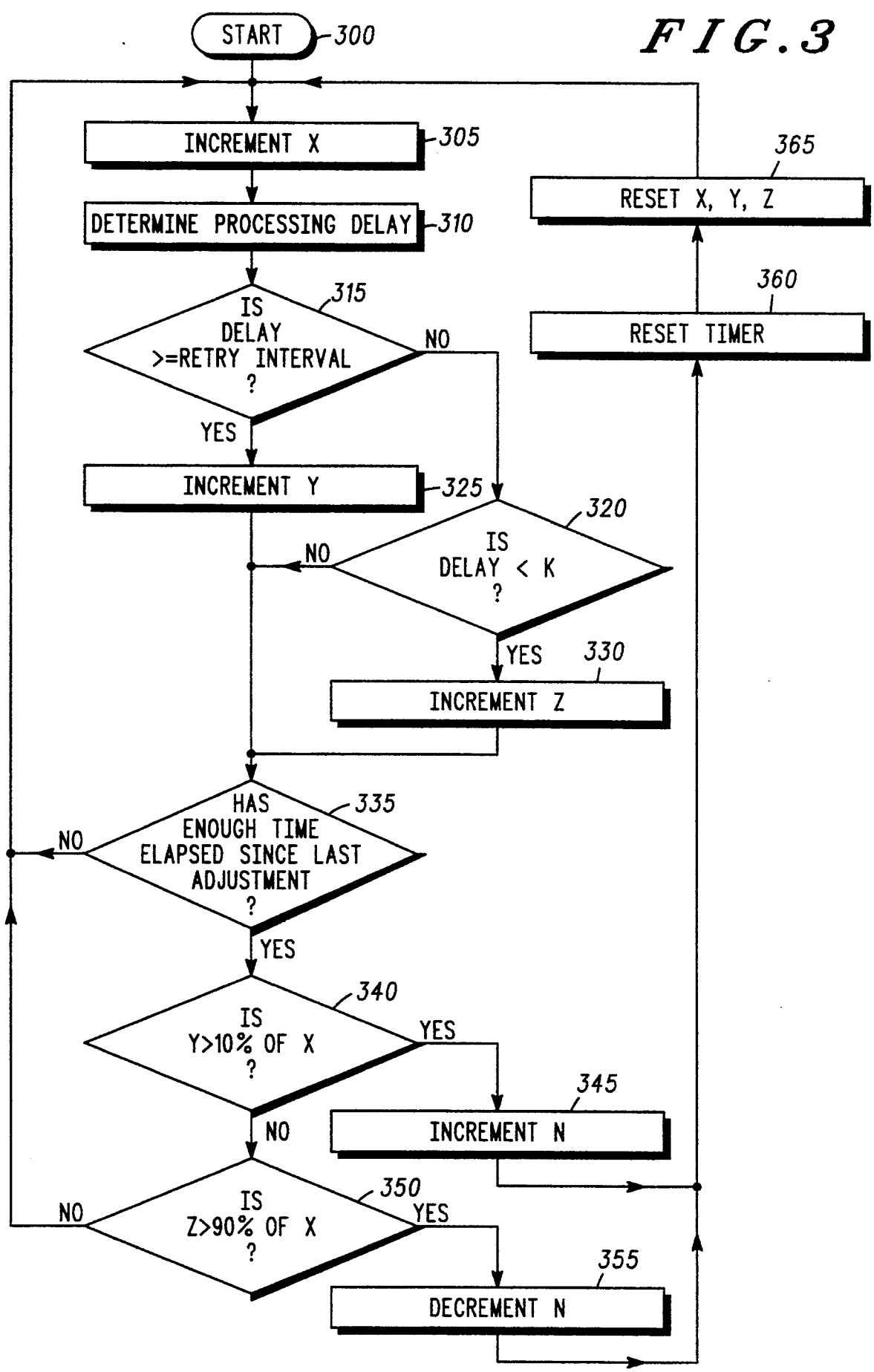
FIG. 3 is a flow chart showing the steps involved in adjusting the channel request retry interval according to the present invention.

Whenever it is desired to reduce the likelihood of more than one channel being assigned to a single mobile unit, the flow chart in FIG. 3 is utilized by a BSS for increasing or decreasing the range of possible channel request retry intervals, that period of time established by the mobile unit guard timer. In operation, the BSS establishes various communications system parameters such as, for example, N, the nominal retry interval available for each mobile unit serviced by the communication system. This communication system parameter is transmitted to each mobile unit via a Broadcast Control Channel (BCCH), along with additional parameters which control for example, the maximum number of times a channel request may be retransmitted by a single mobile unit. When formatting a channel request, each mobile unit will randomly select a value n+k as its channel request retry interval, where n is a value selected between 0 and N-1, and k is a constant which attempts to approximate an optimal channel request retry interval for the communication system. According to the preferred embodiment of the present invention, k is a value selected as either 250 milliseconds or 350 milliseconds.

Entering the flow chart of FIG. 3 at the start block 300, each received channel request is counted at block 305 in order to determine (X), the total number of received requests. Proceeding to block 310, a communication system processing delay is determined for each request. Said processing delay is calculated as the timing difference between the instant a channel request is received by a BTS and the instant a BSS schedules transmission of the corresponding assignment signal. It will be appreciated by those skilled in the art that this determination may also be established by taking the average of several such timing difference measurements. Next, at block 315, the communication system processing delay is compared to the retry interval (n+k). If this comparison identifies a delay greater than or equal to the retry interval, YES branch is taken to block 325 where counter Y is incremented. Else, NO branch is taken to decision block 320 where a check is made to see if the delay is less than k. Assuming it is, the YES branch is taken to block 330 where a counter Z is incremented. Else, NO branch is taken to decision block 335.

At decision block 335, a check is made to see if a proper amount of time has elapsed since the last adjustment. The purpose of this step is to provide a moderate amount of damping in order to assure stable system operation during periods of rapid processing delay change. If not, No branch is taken back to block 305. Otherwise, YES branch is taken to decision block 340 where a check is made to see if (Y), the number of requests with processing delays greater than the retry interval, exceeds a percentage of the total number of channel requests (X). According to the present example, 10 percent is used as a threshold. If so, YES branch is taken to block 345 where the BSS is informed to increase the value of N. An increase in N has the calculated effect of increasing the range of values randomly selected by mobile units as their channel request retry intervals (n+k). Thus, by increasing N as a function of the processing delay, the present invention strives to increase mobile unit retry intervals, thereby reducing the likelihood that more than one channel will be assigned to a single mobile unit. Next, at block 360, the elapsed time counter checked by decision block 335 is reset. Then, at block 365, X, Y and Z counters are reset.

Otherwise, NO branch is taken to decision block 350, where a check is made to see if (Z), the number of channel requests with processing delays less than k, is greater than a specified percentage of the total number of requests made. According to the present example, 90 percent is used as a threshold. If so, YES branch is taken to block 355 where the BSS is informed to decrease the value of N. While a decrease in N has the calculated effect of decreasing channel request retry intervals, it is nonetheless desirable to permit quicker channel request retransmissions in light of quicker system response times. Next, at block 360, the elapsed time counter checked by decision block 335 is reset. Then, at block 365, the X, Y and Z counters are reset. Otherwise NO branch is taken back to block 305.

Figure 4:
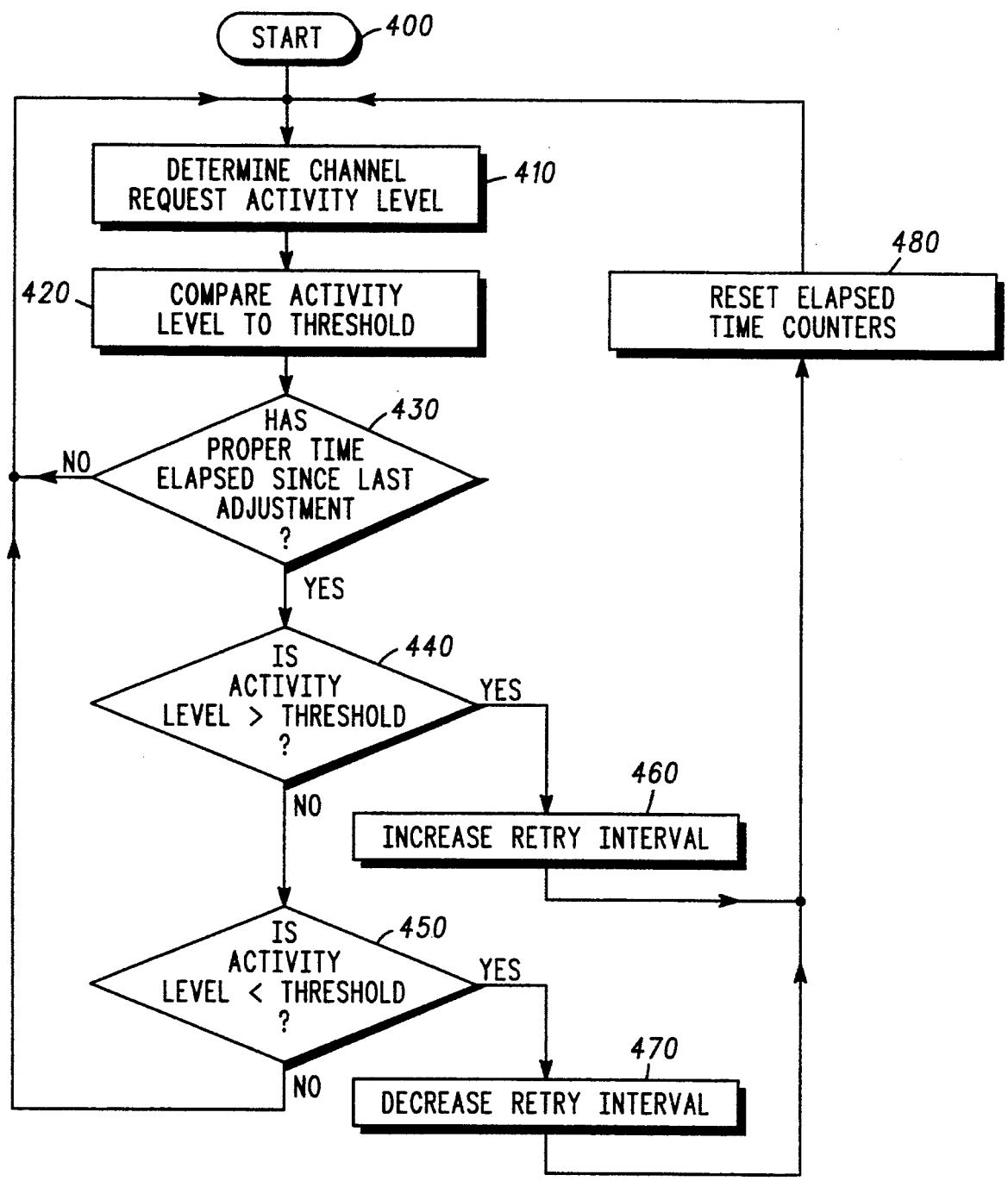
FIG. 4 is a flow chart showing alternative steps involved in adjusting the channel request retry interval according to the present invention.

An alternative method of adjusting a mobile unit's channel request retry interval in order to reduce the likelihood that more than one channel will be allocated to a single mobile unit is shown in the flow chart of FIG. 4. Entering the flow chart of FIG. 4 at the start block 400, a level of channel request traffic activity across the RACH is determined at block 410 by monitoring a number of received channel requests. Next, at block 420, the number of channel requests is compared to a predetermined threshold level.

Proceeding to decision block 430, a check is made to see if a proper amount of time has elapsed since the last retry interval adjustment. The purpose of this step is to provide a moderate amount of damping in order to assure stable system operation during periods characterized by rapid fluctuation in channel request traffic. If not, No branch is taken back to block 410. Otherwise, YES branch is taken to decision block 440 where a check is made to see if the number of channel requests exceed the threshold level. If so, YES branch is taken to block 460 where the BSS is informed to increase the value of N. An increase in N has the calculated effect of increasing the range of values randomly selected by mobile units as their channel request retry intervals. Thus, by increasing N as a function of channel request traffic, the present invention strives to increase the mobile unit retry interval during periods when the BSS is experiencing heavy loading, thereby reducing the likelihood that more than one channel will be assigned to a single mobile unit. Next, at block 480, the elapsed time counter checked by decision block 430 is reset. Otherwise, NO branch is taken to decision block 450, where a check is made to see if the number of channel requests falls below the threshold level. If so, YES branch is taken to block 470 where the BSS is informed to decrease the value of N. While a decrease in N has the calculated effect of decreasing channel request retry intervals, it is nonetheless desirable to permit quicker channel request retransmissions in light of decreased system loading. Next, at block 480, the elapsed time counter checked by decision block 430 is reset. Otherwise NO branch is taken back to block 410.

In summary, the present invention discloses a method and an apparatus for reducing superfluous channel allocation between a plurality of mobile units, and a communication system servicing those mobile units, by adjusting the mobile unit's channel request retry interval, or at least the range of mobile unit channel request retry intervals, whereby the likelihood of more than one channel being assigned to a mobile unit making multiple requests is reduced. While it is suggested that said reduction can be achieved as a function of processing delays or levels of channel request traffic, it will be obvious that additional modifications may be made without departing from the spirit of this disclosure. For example, N may be adjusted as a function of peak hour or time of day. In addition, it may be desirable to adjust N during the detection of a fault condition.

What is claimed is:

1. In a communication system performing radio channel management, a method for reducing superfluous channel allocations among a plurality of mobile units, making multiple service requests to communication system base site equipment; said method comprising the steps of:

receiving, at a base site, a channel request from at least one of the plurality of mobile units;

determining, at the base site, a communication system processing delay associated with the received request; and adjusting system parameters that control a range of mobile unit channel request retry intervals as a function of the processing delay, to reduce the likelihood of more than one channel being assigned to the requesting mobile unit.

2. The method of claim 1 further comprising the steps of:
   allocating a channel to support mobile unit communication;
   activating the allocated channel;
   scheduling transmission of an assignment reject signal to the requesting mobile unit when the channel is not successfully allocated:
   scheduling transmission of an assignment reject signal to the requesting mobile unit when the channel is not successfully activated;
   scheduling transmission of an assignment signal to the requesting mobile unit upon the successful allocation and activation of a communication channel; and
   transmitting assignment signals and assignment reject signals to the requesting mobile unit as a function of scheduling.

3. The method of claim 2 wherein assignment signal transmissions are scheduled by the base site according to a corresponding channel request's timing stamp.

4. The method of claim 3 wherein assignment signals receive greater priority than assignment reject signals having the same timing stamp.

5. The method of claim 1 wherein the step of determining a communication system processing delay further comprises the steps of:
   providing a timing stamp for the received channel request to identify the instant when the channel request is received by the base site equipment; and
   establishing the processing delay, by determining a timing difference between the instant the channel request is received by the base site equipment and the instant the base site schedules an assignment signal for transmission to the requesting mobile unit.

6. The method of claim 1 wherein the step of adjusting system parameters further comprises the steps of:
   monitoring communication system processing delays;
   comparing the processing delays to predetermined values;
   altering communication system parameters that increase the range of mobile unit retry intervals when the processing delay exceeds a predetermined value;
   altering communication system parameters that decrease the range of mobile unit retry intervals when the processing delay falls below a predetermined value; and
   transmitting said communication system parameters from the base site to the mobile unit for use in selecting a retry interval.

7. The method of claim 6 wherein the step of adjusting the channel request retry interval further includes the step of:
   determining a period of time since a last communication system parameter adjustment; and
   performing a next communication system parameter adjustment only after expiration of a predetermined period of time.

8. The method of claim 2 wherein assignment reject signal transmissions are scheduled by the base site according to the received channel request's timing stamp.

9. In a communication system performing radio channel management, a method for reducing superfluous channel allocations among a plurality of mobile units, making multiple service requests to communication system base site equipment; said method comprising the steps of:
   receiving; at a base site; channel requests from the plurality of mobile units across a request channel;
   determining; at the base site; a level of mobile unit activity on the request channel; and
   adjusting communication system parameters that control a range of mobile unit channel request retry intervals as a function of the level of activity on the request channel, to reduce the likelihood of more than one channel being assigned to a mobile unit making multiple requests.

10. The method of claim 9 further comprising the steps of:
    allocating channels to support mobile unit communications;
    activating the allocated channels;
    scheduling transmission of an assignment reject signal to the requesting mobile unit when the channel is not successfully allocated;
    scheduling transmission of an assignment reject signal to the requesting mobile unit when the channel is not successfully activated;
    scheduling transmission of an assignment signal to a requesting mobile unit upon the successful allocation and activation of a communications channel; and
    transmitting assignment signals and assignment reject signals to requesting mobile units as a function of scheduling.

11. The method of claim 9 wherein the step of adjusting communication system parameters further comprises the steps of:
    comparing a number of received channel requests to a predetermined value;
    altering communication system parameters that increase the range of mobile unit retry interval when the number of received channel requests exceeds the predetermined value;
    altering communication system parameters that decrease the range of mobile unit retry intervals when the number of received channel requests falls below the predetermined value; and
    transmitting said communication system parameters from the base site equipment to the plurality of mobile units serviced by that base site for use in selecting a retry interval.

12. The method of claim 11 wherein the step of adjusting the range of mobile unit request retry intervals further includes the steps of:
    determining a period of time since a last communication system parameter adjustment; and
    performing a next communication system parameter adjustment only after expiration of a predetermined period of time.

13. In a communication system performing radio channel management, a method for reducing superfluous channel allocations among a plurality of mobile units, making multiple requests to communication system base site equipment, said method comprising the steps of:
    receiving at a base site, a channel request from at least one of the plurality of mobile units;
    placing a timing stamp on the received channel request to identify the instant when the request is received by the base site determining a communication system processing delay as a timing difference between the instant when the request is received by the base site and an instant when the base site schedules service for the requesting mobile unit;

comparing the communication system processing delay to predetermined values; and adjusting communication system parameters that control a range of mobile unit channel request retry intervals as a function of the comparison, to reduce the likelihood of more than one channel being assigned to a mobile unit making multiple requests.

14. In a communication system performing radio channel management, a transceiver for reducing superfluous channel allocations among a plurality of mobile units making multiple service requests, said transceiver comprising:

a receiver for receiving a channel request from at least one of the plurality of mobile units;

means, coupled to the receiver, for determining a communication system processing delay;

means: coupled to the determining means, for comparing the processing delay to predetermined values:

means; coupled to the comparing means, for adjusting system parameters that control a range of mobile unit channel request retry intervals as a function of the comparison; and a transmitter: coupled to the adjusting means, for transmitting said system parameters to said plurality of mobile units serviced by the transceiver for use in selecting an alternate retry interval to reduce the likelihood that more than one channel will be assigned to a single mobile unit.

15. The transceiver of claim 14 further comprising:

means, coupled to the comparing means, for altering system parameters that increase the range of mobile unit retry intervals when the processing delay exceeds a predetermined value; and means, coupled to the comparing means, for altering system parameters that decrease the range of mobile unit retry intervals when the processing delay is less than a predetermined value.

16. In a communication system performing radio channel management, a transceiver for reducing superfluous channel allocations among a plurality of mobile units making multiple service requests: said transceiver comprising:

a receiver for receiving channel requests from the plurality of mobile units across a request channel;

means, coupled to the receiver, for determining a level of activity across the request channel;

means, coupled to the determining means, for adjusting communication system parameters that control a range of mobile unit retry intervals as a function of the level of activity on the request channel; and a transmitter: coupled to the adjusting means; for transmitting said communication system parameters to said plurality of mobile units serviced by the transceiver for use in selecting an alternate retry interval.

17. In a communication system performing radio channel management, a transceiver for reducing superfluous channel allocations among a plurality of mobile units making multiple service requests: said transceiver comprising:

receiver for receiving a channel request from at least one of the plurality of mobile units;

means, coupled to the receiver, for placing a timing stamp on the received request to identify the instant when the request is received;

means, coupled to the receiver, for determining a processing delay as a timing difference between the instant when the request is received and an instant when the transceiver schedules service for the requesting mobile unit;

means: coupled to the determining means, for comparing the processing delay to predetermined values;

means,, coupled to the comparing means, for adjusting system parameters that control a range of mobile unit request retry intervals as a function of the comparison: and a transmitter; coupled to the adjusting means; for transmitting said system parameters to said plurality of mobile units serviced by the transceiver for use in selecting an alternate retry interval,, thereby reducing the likelihood that more than one channel will be assigned to a single mobile unit.

18. The transceiver of claim 17 further comprising:

means, coupled to the comparing means, for altering system parameters that increase the range of mobile unit retry intervals when the processing delay exceeds a predetermined value; and means, coupled to the comparing means, for altering system parameters that decrease the range of mobile unit retry intervals when the processing delay is less than a predetermined value.

* * * * *

UNITED STATES PATENT AND TRADEMARK OFFICE
CERTIFICATE OF CORRECTION

PATENT NO. : 5,355,516          Page 1 of 2

DATED : October 11, 1994

INVENTOR(S) : Brenda K. Herold and Christine K. Ioriatti

It is certified that error appears in the above-indentified patent and that said Letters Patent is hereby corrected as shown below:

Col. 6, line 60, "equipment;" should be --equipment,--.

Col. 7, line 11, "allocated:" should be --allocated;--.

Col. 8, line 3, "equipment;" should be --equipment,--.

Col. 8, line 5, "receiving; at a base site;" should be --receiving, at a base site,--.

Col. 8, line 7, "determining; at the base site;" should be --determining, at the base site,--.

Col. 9, line 22, "means:" should be --means,--.

Col. 9, line 24, ":" should be --;--.

Col. 9, line 25, "means; coupled" should be --means, coupled--.

Col. 9, line 29, "transmitter:" should be --transmitter,--.

Col. 9, line 47, "requests:" should be --requests,--.

Col. 10, line 9, "transmitter: coupled to the adjusting means;" should be --transmitter, coupled to the adjusting means,--.

Col. 10, line 17, "requests:" should be --requests,--.

Col. 10, line 19, "receiver for" should be --a receiver for--.

Col. 10, line 29, "means: coupled" should be --means, coupled--.

Col. 10, line 32, "means,, coupled" should be --means, coupled--.

Col. 10, line 35, "comparison: and" should be --comparison; and--.

Col. 10, line 36, "transmitter; coupled to the adjusting means;" should be --transmitter, coupled to the adjusting means,--.

Col. 10, line 39, "interval,," should be --interval,--.

UNITED STATES PATENT AND TRADEMARK OFFICE
CERTIFICATE OF CORRECTION

PATENT NO. : 5,355,516
DATED : October 11, 1994
INVENTOR(S) : Brenda K. Herold and Christine K. Ioriatti It is certified that error appears in the above-indentified patent and that said Letters Patent is hereby corrected as shown below:

Col. 10, line 29, "means: coupled" should be --means, coupled--.
Col. 10, line 32, "means,, coupled" should be --means, coupled--.
Col. 10, line 35, "comparison: and" should be --comparison; and--.
Col. 10, line 36, "transmitter; coupled to the adjusting means;" should be --transmitter, coupled to the adjusting means,--.
Col. 10, line 39, "interval,," should be --interval,--.

Signed and Sealed this

Twenty-eighth Day of November 1995

Attest:

BRUCE LEHMAN

*Attesting Officer*  *Commissioner of Patents and Trademarks*